United States Patent
Knittl et al.

(10) Patent No.: US 11,034,242 B2
(45) Date of Patent: Jun. 15, 2021

(54) MOTOR VEHICLE WITH A DISPLAY ARRANGEMENT AND METHOD FOR OPERATING A DISPLAY ARRANGEMENT OF A MOTOR VEHICLE

(71) Applicant: AUDI AG, Ingolstadt (DE)

(72) Inventors: Thomas Knittl, Ingolstadt (DE); Peter Zeinar, Ingolstadt (DE); Ulrich Beierlein, Ingolstadt (DE); Soenke Tanneberger, Ingolstadt (DE); Edwin Ollefers, Ingolstadt (DE); Karl-Heinz Rothfuss, Gaimersheim (DE); Imanuel Merk, Dietfurt a.d. Altmuehl (DE)

(73) Assignee: AUDI AG, Ingolstadt (DE)

( * ) Notice: Subject to any disclaimer, the term of this patent is extended or adjusted under 35 U.S.C. 154(b) by 38 days.

(21) Appl. No.: 16/488,900

(22) PCT Filed: Feb. 23, 2018

(86) PCT No.: PCT/EP2018/054462
§ 371 (c)(1),
(2) Date: Aug. 26, 2019

(87) PCT Pub. No.: WO2018/154032
PCT Pub. Date: Aug. 30, 2018

(65) Prior Publication Data
US 2021/0023948 A1    Jan. 28, 2021

(30) Foreign Application Priority Data
Feb. 27, 2017  (DE) .......................... 102017203173.5

(51) Int. Cl.
*B60K 37/02*    (2006.01)
*B60K 35/00*    (2006.01)

(52) U.S. Cl.
CPC .............. *B60K 37/02* (2013.01); *B60K 35/00* (2013.01); *B60K 2370/155* (2019.05);
(Continued)

(58) Field of Classification Search
CPC .......... B60K 37/02; G01D 11/28; B60Q 3/14; B60Q 3/12; B60Q 3/64
See application file for complete search history.

(56) References Cited

U.S. PATENT DOCUMENTS 5,270,682 A    12/1993  Aoki
5,440,428 A *  8/1995  Hegg ..................... B60K 37/02
                                             359/630
(Continued)

FOREIGN PATENT DOCUMENTS

DE    197 08 610 A1   9/1998
DE    198 48 842 A1   5/1999
(Continued)

OTHER PUBLICATIONS

English Translation by WIPO dated Sep. 6, 2019 of the International Preliminary Report on Patentability in corresponding International Patent Application No. PCT/EP2018/054462.
(Continued)

*Primary Examiner* — Christopher E Leiby
(74) *Attorney, Agent, or Firm* — Staas & Halsey LLP

(57) ABSTRACT

A first display device with a first display face is arranged in such a way that the first display face can be at least partially seen from a passenger compartment of the motor vehicle. A second display device with a second display face is arranged in such a way that the second display face cannot be seen from the passenger compartment. The two display faces are arranged with respect to one another in such way that the second display face is reflected in the first display face, and as a result of this a virtual display plane which can be seen
(Continued)

from the passenger compartment is generated behind the first display face.

20 Claims, 2 Drawing Sheets

(52) U.S. Cl.
CPC ...... *B60K 2370/23* (2019.05); *B60K 2370/31* (2019.05); *B60K 2370/52* (2019.05)

(56) References Cited

U.S. PATENT DOCUMENTS

| | | | | |
|---|---|---|---|---|
| 2009/0109126 A1* | 4/2009 | Stevenson | ........ | H04N 21/42208 345/4 |
| 2009/0261612 A1* | 10/2009 | Takayama | .............. | B60K 37/02 296/70 |
| 2015/0042959 A1* | 2/2015 | Leary | ..................... | B60K 35/00 353/13 |

FOREIGN PATENT DOCUMENTS

| | | |
|---|---|---|
| DE | 102009032069 A1 | 1/2011 |
| DE | 202013007158 U1 | 12/2014 |
| DE | 102014019122 A1 | 6/2016 |
| DE | 102017203173 | 2/2017 |
| EP | 0 646 823 A2 | 4/1995 |
| WO | PCT/EP2018/054462 | 2/2018 |

OTHER PUBLICATIONS

International Search Report for PCT/EP2018/054462 dated May 24, 2018.

German Office Action for German Application No. 10 2017 203 173.5 dated Sep. 22, 2017.

* cited by examiner

MOTOR VEHICLE WITH A DISPLAY ARRANGEMENT AND METHOD FOR OPERATING A DISPLAY ARRANGEMENT OF A MOTOR VEHICLE

CROSS REFERENCE TO RELATED APPLICATIONS

This application is the U.S. national stage of International Application No. PCT/EP2018/054462, filed Feb. 23, 2018, and claims the benefit thereof. The International Application claims the benefit of German Application No. 10 2017 203 173.5 filed on Feb. 27, 2017, both applications are incorporated by reference herein in their entirety.

BACKGROUND

Described below are a motor vehicle with a display arrangement, and a method for operating a display arrangement of a motor vehicle.

In motor vehicles there is increasingly a need to be able to display a large amount of information for the driver and also front seat passenger in a particularly clearly organized way. For example while a motor vehicle is traveling it is possible to display navigation instructions, information relating to an Infotainment system and, if appropriate, also other warning messages according to requirements and in a way which can be seen clearly by the driver and front seat passenger. The fact that information is presented pre-processed in a two-dimensional fashion, by various displays which are arranged in the passenger compartment of the vehicle, can lead to a situation in which the large amount of information is, under certain circumstances, not particularly easy to read or is unfavorably presented in some other way.

Three-dimensional representation is already customary nowadays in television sets and in the cinema. However, an associated pair of glasses is necessary for this experience. 3D displays, which do not require such glasses, are also already available. Such 3D displays are to a certain extent already installed with relatively small dimensions in games consoles or notebooks. In many games devices or also in display window design there are structures which use reflective planes to produce displays with a depth effect and which likewise do not require a pair of glasses. The examples mentioned above are only poorly suited for use in motor vehicles. When three-dimensional contents are displayed three dimensionally using a pair of glasses, the glasses as such constitute an impediment. They darken the surroundings and restrict the field of vision, which would be very disadvantageous, in particular, for a driver of a motor vehicle. For reasons of design, 3D displays without a pair of glasses provide a very restricted viewing angle and often have relatively low resolution. Furthermore, they are also not available in large sizes. Three-dimensional effects which can be achieved by a certain arrangement of mirrors and displays have the disadvantage that in the case of large structures the mirror arrangements which are necessary for the three-dimensional representation cannot be shielded from undesired effects, as a result of which disruptive reflections occur.

SUMMARY

Using the display arrangement described herein, a large amount of information can be displayed particularly well in a motor vehicle.

The motor vehicle described herein has a display arrangement including a first display device with a first display face which is arranged in such a way that the first display face can be at least partially seen from a passenger compartment of the motor vehicle. The display arrangement also includes a second display device with a second display face which is arranged in such a way that the second display face cannot be seen from the passenger compartment. The two display faces are arranged in respect of one another in such a way that the second display face is reflected in the first display face, and as a result of this a virtual display plane which can be seen from the passenger compartment is generated behind the first display face.

In the display arrangement, the reflective property of the first display face is used in such a way that the second display face, which cannot be seen from the passenger compartment, reflects in the first display face in such a way that a virtual display plane which can be seen from the passenger compartment is generated behind the first display face. In this virtual display plane, the contents which are displayed by the second display device, on its second display face, can be seen by vehicle occupants. The reflective properties of the first display face are therefore used to provide an additional display plane in the form of the virtual display plane.

The contents which are displayed by the first display device or the second display device appear to be arranged therefore in a three-dimensional fashion one behind the other to vehicle occupants, wherein contents which are displayed by the first display device and contents which are displayed by the second display device appear to be arranged one behind the other on the first display face and the virtual display plane. As a result, various contents can be displayed distributed over the first display face and the virtual display plane. Particularly important information, such as for example a speed display, warning messages and the like, can be displayed, for example, on the first display face. Information which relates, for example, to the Infotainment system of the motor vehicle can be displayed, for example, by the second display device, so that this information appears behind the first display face on the virtual display plane. In addition it is also possible to actuate the first display device and the second display device in such a way that symbols which are displayed by them complement one another. For example, it would be conceivable that a part of a navigation arrow is displayed by the first display device and a further part of the navigation arrow is displayed by the second display device, so that the navigation arrow extends in its entirety in a three-dimensional fashion over the first display face and the virtual display plane.

In order to actuate the display arrangement, a control device is provided which is configured to actuate both display devices. The extent of the reflection of the first display face and of the second display face and therefore the extent of the representation of the virtual display plane can be controlled by a suitable coating of the first display face and/or by a suitable brightness setting of the second display device.

Using the display arrangement of the motor vehicle, 3D glasses are therefore not required to achieve a three-dimensional display effect for vehicle occupants. The quality of the representation by the two display devices can, as already mentioned, be controlled precisely by a correspondingly suitable reflective coating of the first display face and/or by a suitable setting of the brightness of the second display device. Therefore, a large amount of information can be represented for the driver and the front seat passenger and for other vehicle occupants in a particularly well prepared and three-dimensional fashion by the display device of the motor vehicle.

One advantageous embodiment of the display arrangement provides that the first display face has a partial region which is invisible, that is to say cannot be seen, from the passenger compartment and is arranged with respect to the second display face in such a way that the partial region is reflected in the second display face, and as a result a further virtual display plane which can be seen from the passenger compartment is generated behind the virtual display plane. In addition to the first display face and the virtual display face, which is generated owing to the reflection of the second display face in the first display face, there may be a third display plane generated by the partial region, which is invisible or cannot be seen from the passenger compartment, of the first display face is in turn reflected in the second display face, as a result of which the further virtual display face which can be seen from the passenger compartment is generated behind the other virtual display plane. Overall, therefore three display planes are made possible, wherein only the first display face is actually located where it can be seen by a vehicle occupant, while the two other virtual display planes are, as their designation already says, purely of a virtual nature and are produced owing to the described reflections on the respective display faces. The provision of the further virtual display plane makes it possible to represent even more contents three dimensionally by a highly reflective coating of the second display face and a suitable brightness control of at least the partial region of the first display face to control precisely the quality of the representation of the further virtual display plane. Warning messages and particularly important messages may be displayed on the first display face, wherein less important information is displayed on the virtual display planes located behind the first display face. In addition, it is also possible to actuate the two display devices in such a way that a symbol or else any other desired object is represented extending three dimensionally over the first display face and the two virtual display planes. This can be particularly appropriate, for example, for navigation displays.

A further advantageous embodiment of the display arrangement has the first display face curved. For example, the first display face can be curved about a vertical axis of the motor vehicle. The three-dimensional effect is also additionally amplified by the curvature of the first display face. However, it is also possible for the first display face not to be curved, that is to say to be planar.

According to a further advantageous embodiment of the display arrangement, the first display face and the second display face are arranged in the region of a dashboard of the motor vehicle, underneath a windshield of the motor vehicle. In the region of the dashboard it is possible for the two display faces to be particularly well embedded and protected against destructive instant light. The two display faces can be embedded, for example, in an instrument panel mount of the motor vehicle.

In a further advantageous refinement of the display arrangement, the first display face and the second display face extend in the transverse direction of the vehicle from a driver's sitting area to a front seat passenger's sitting area. The two display faces may extend over the entire width of the passenger compartment of the motor vehicle. As a result, contents for drivers and front seat passengers can be displayed over a particularly large area by the two display devices, specifically in a three-dimensional fashion. Information which is displayed by the two display devices can therefore be particularly easily stacked intelligently, which improves the ease of comprehension and the experienced quality for drivers and front seat passengers. As a result of the fact that the display faces extend over the entire width of the motor vehicle, three-dimensional contents which are adapted to the driver and the front seat passenger can be represented particularly easily in the region of respective fields of vision of the driver and front seat passenger. The large width of the two display faces additionally always permits the contents to be displayed in such a way that both the driver and front seat passenger can see the contents well.

In a further advantageous embodiment, the motor vehicle has a sensing device which is configured to sense the position of the eyes of at least one vehicle occupant, wherein a control device is configured to actuate at least one of the two display devices in accordance with the sensed position of the eyes, in order to compensate for a parallax effect. There also may be provision to account for the shifting of contents between the first display face and the virtual display plane or the virtual display planes, which shifting arises as a result of the display planes which are arranged one behind the other in accordance with the position of a vehicle occupant's eyes, that is to say to take into account the so-called parallax effect. The contents which are represented three dimensionally by the display devices on the basis of the reflection can therefore be adapted in relation to the sitting position, in particular in relation to the respective position of a vehicle occupant's eyes. In order to determine the sitting position or the position of the eyes more precisely, for example the sensing device can have a passenger compartment camera. By taking into account the position of the eyes and the compensation of the parallax effect it is possible for the three-dimensional representation of contents to be implemented for a wide variety of positions of the eyes in a way which can be particularly precisely reproducible over the various display planes.

According to a further advantageous embodiment, at least one of the two display devices is a screen is configured to display two different screen contents depending on the viewing angle. This type of screen is what is referred to as a so-called dual view display. Such a display permits two images to be represented on the same screen, wherein, for example, a driver and a front seat passenger each see a different image owing to their different viewing angles. While, for example, only the navigation map or the on-board computer can be seen solely from the driver's seat, the front seat passenger can, for example, view a film on the same screen. In combination with the plurality of display planes which can be generated it is therefore possible to double the available area for representing contents, providing that there is a correspondingly high resolution of the at least one dual view display. It is also possible for both display devices to be embodied as dual view displays. In that case, different contents can be displayed simultaneously for e.g. the driver and the front seat passenger, on the first display face and on the virtual display plane arranged behind it.

In a further advantageous embodiment, the sensing device is configured to sense respective positions of the eyes of the driver and front seat passenger, wherein the control device is designed to actuate the screen, which is configured to display two different screen contents depending on the viewing angle, as a function of the sensed position of the eyes, in order to compensate for a parallax effect for the driver and the front seat passenger. Both display devices may be embodied in the form of such a screen, so that in the case of the three display planes, that is to say the presence of the two virtual display planes, the parallax effect for the driver and the front seat passenger can as it were be compensated over all three display planes. In this context it is, on the one hand, possible that contents which are different per se are displayed by the driver and the front seat passenger owing to their different viewing angles. However, it is alternatively equally possible that precisely the same contents with the same relative positioning of the contents over the three display planes or else two display planes are displayed to the driver and the front seat passenger, which only becomes possible by virtue of the fact that the display planes are configured in the form of the dual view display.

In a further advantageous embodiment, the first display face is arranged underneath a ventilation outlet, set back with respect to a front edge of the ventilation outlet. The first display face is as a result protected particularly well against undesired light irradiation and reflection effects. The second display face may be arranged underneath the first display face with respect to the vertical direction of the vehicle and somewhat in front of the first display face in the longitudinal direction of the vehicle. The two display faces can, for example, be oriented in parallel with one another so that no distortions occur during the reflections, which distortions would subsequently have to be corrected by corresponding actuation of the display devices.

In the method for operating the display arrangement, or an advantageous embodiment of the display arrangement, the first display device and the second display device are actuated in such a way that contents are displayed on the first display face and the virtual display plane. Advantageous refinements of the motor vehicle are to be considered as advantageous refinements of the method and vice versa, wherein the motor vehicle or the display arrangement is able to carry out the method. Further advantages, features and details will become apparent from the following description of an exemplary embodiment and by reference to the drawings. The features and combinations of features which are specified above in the description and the features and combinations of features which are specified below in the description of the figures and/or shown solely in the figures can be used not only in the respectively specified combination but also in other combinations or alone without departing from the scope of the invention.

BRIEF DESCRIPTION OF THE DRAWINGS

These and other aspects and advantages will become more apparent and more readily appreciated from the following description of the exemplary embodiment, taken in conjunction with the accompanying drawings of which.

DETAILED DESCRIPTION OF THE PREFERRED EMBODIMENT

Figure 1:
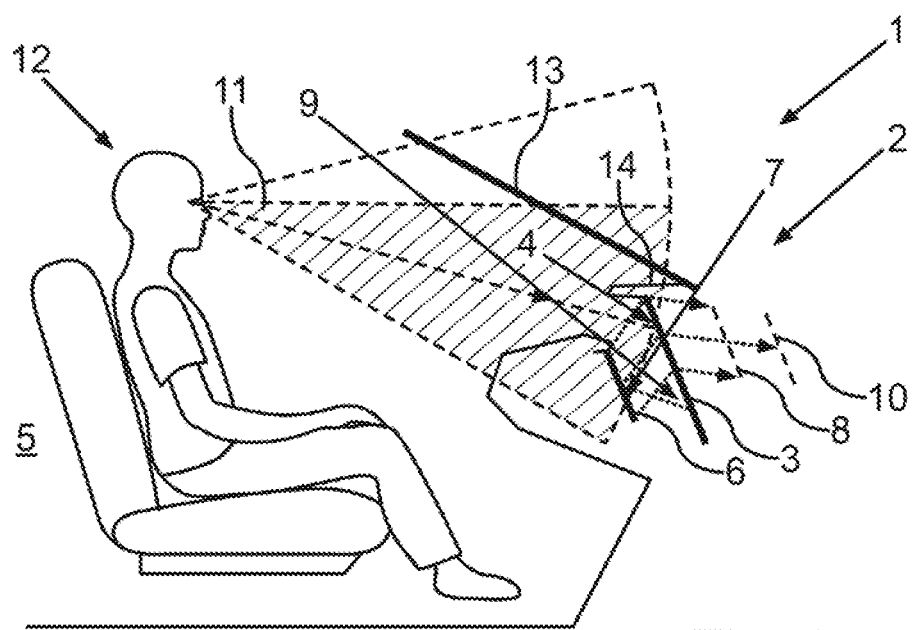
FIG. 1 is a schematic side view of an interior of a motor vehicle, wherein the display arrangement is illustrated with two display devices which are oriented in parallel with one another and by which a plurality of virtual image planes which are arranged one behind the other are generated by reflection effects.

A motor vehicle 1 is shown in a schematic side view in FIG. 1. The motor vehicle 1 has a display arrangement 2 which includes a display device 3 with a first display face 4 which is arranged in such a way that the first display face can be at least partially seen from a passenger compartment 5 of the motor vehicle 1. The display arrangement 2 also includes a second display device 6 with a second display face 7 which is arranged in such a way that the second display face cannot be seen from the passenger compartment 5. The two display faces 4, 7 are arranged in such a way that the second display face 7 is reflected in the first display face 4, and as a result of which a virtual display plane 8 which can be seen from the passenger compartment 5 is generated behind the first display face.

The first display face 4 additionally has a partial region 9 which can be seen from the passenger compartment 5 and is arranged with respect to the second display face 7 so that the partial region 9 is reflected in the second display face 7, and as a result a further virtual display plane 10 which can be seen from the passenger compartment 5 is generated behind the virtual display plane 8.

The two display devices 3, 4 can be, for example, flat screens, for example in the form of TFT monitors or the like. Irrespective of the actual technology of the display devices, the two display faces 4 and 7 are embodied in a reflective fashion so that the virtual image planes 8, 10 can be generated by the described reflection of the display faces 4, 7.

A field of vision 11 of a driver 12 is indicated schematically for the sake of better understanding. As is apparent, the driver 12 is looking forward through a windshield 13 of the motor vehicle 1, wherein the two display devices 3, 6 are arranged underneath the windshield 13 and a ventilation outlet 14. Both display devices 3, 6 are reliably protected against undesired incident light, in particular against solar radiation, by the ventilation outlet 14, so that the representation quality of the two display devices 3, 6 is not adversely affected by light irradiation. Viewed in the longitudinal direction of the vehicle, to be more precise viewed in the direction of forward travel, the second display face 7 is arranged in front of the first display face 4. The second display face 7 is arranged here so far underneath the first display face 4 that it cannot be seen by the driver 12. Both display faces 3, 6 can be integrated, for example, into an instrument panel mount (not denoted in more detail here) of the motor vehicle. In addition it is possible for the first display face 4 to be curved, specifically about an axis running in the vertical direction of the vehicle. As a result, a three-dimensional display effect is amplified once more.

As a result of the described arrangement of the two display faces 4, 7, contents which are displayed by the two display devices 3, 6 appear to be arranged three dimensionally one behind the other to the driver 12, specifically distributed on the first display face 4 and the two virtual display planes 8, 10 which are arranged behind the latter. Different information can therefore be displayed to the driver distributed in a three-dimensional fashion over the three display planes. Since the driver 12 cannot see the second display device 6 and the second display face 7 at all, the depth effect, which arises owing to the two virtual display planes 8, 10, appears to arise magically. As a result of the intelligent embedding of the display devices 3, 6 and therefore also the display faces 4, 7, possibly disruptive reflections are reduced to a minimum. The quality of the display of the representation can be controlled precisely by the type of reflective coating of the two display faces 4, 7 and the brightness of the two display devices 3, 6.

As already mentioned, overall a total of three display planes are therefore made possible. The display plane which is displayed most closely to the driver 12 is formed by the first display face 4. The middle display plane in the form of the virtual display plane 8 is formed by the reflection of the second display face 7 in the first display face 4. Finally, the deepest, that is to say furthest away, virtual display plane 10 is provided by the reflection of the lower partial region 9, lying in the non-visible area, of the first display face. By virtue of the total of three display planes which are arranged one behind the other it is possible to stack information particularly intelligently, as a result of which the ease of comprehension of the displayed information is increased. In addition, there is no need for any further accessories, such as for example a pair of 3D glasses, in order to achieve the three-dimensional effect.

Figure 2:
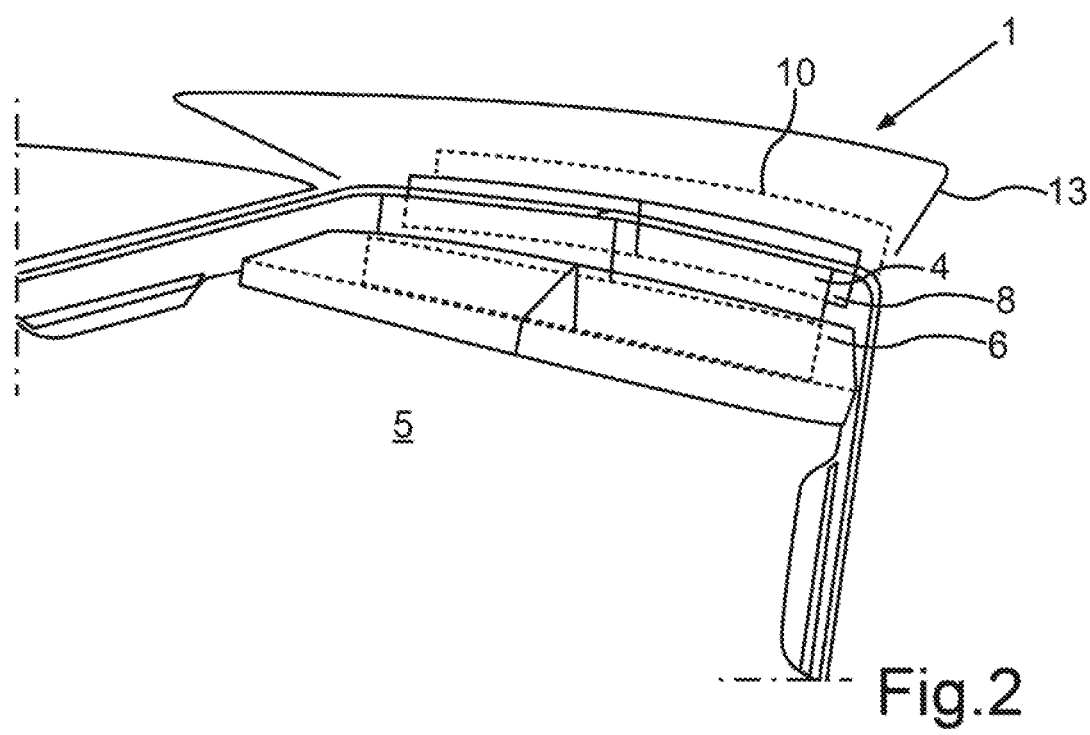
FIG. 2 is a schematic perspective view of the passenger compartment of the motor vehicle, wherein the arrangement of the display devices and of the virtual display planes arranged behind them is illustrated.

The passenger compartment 5 of the motor vehicle 1 is illustrated in a perspective view in FIG. 2. The arrangement of the first display face 4, of the virtual display plane 8 and of the further virtual display plane 10 can be seen clearly once more in this illustration. The two display faces 4, 7 extend over the entire width of the passenger compartment 5. The three display planes, which are provided by the first display face 4 and the two virtual display planes 8 and 10, extend in a band shape of the entire width of the passenger compartment of the motor vehicle 1. For example, the visible region of the first display face 4 and the two virtual display planes 10 can have a height of 16 to 17 centimeters, these display planes 10 ending in the region of the A pillars.

Figure 3:
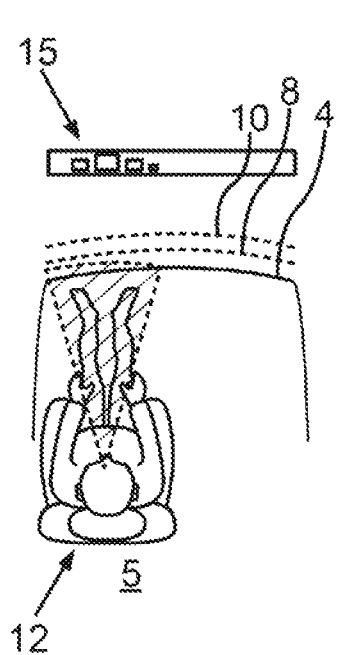
FIG. 3 is a schematic plan view of the passenger compartment, wherein the representation of driving-specific contents by the display devices for a driver is illustrated.

FIG. 3 shows the passenger compartment 5 in a schematic plan view, wherein only the driver 12 is seated in the motor vehicle 1. The three display planes which are arranged one behind the other, in the form of the first display face 4 and the two virtual display planes 8, 10 are in turn indicated schematically. Furthermore, driver-specific contents 15, which are displayed directly in front of the driver 12 by the two display devices 3, 6, are illustrated schematically.

Figure 4:
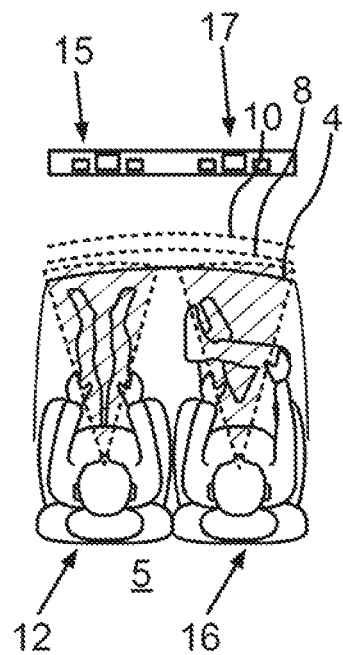
FIG. 4 is a further schematic plan view of the passenger compartment of the motor vehicle, wherein apart from the driver a front seat passenger is also illustrated, to whom driver-specific contents and front seat-passenger-specific contents are respectively displayed directly in front of them.

FIG. 4 shows the passenger compartment 5 in a further schematic plan view, wherein a front seat passenger 16 is also seated next to the driver 12. Through a corresponding arrangement of the two display devices 3, 6, front-seat-passenger-specific contents 17 are also input directly in front of the front seat passenger 16 by the first display face 4 and the two virtual display planes 8, 10, apart from the driver-specific contents 15. The driver 12 and the front seat passenger 16 therefore look straight ahead in front of them and at the same time contents which are tailored to them are respectively displayed to them.

Figure 5:
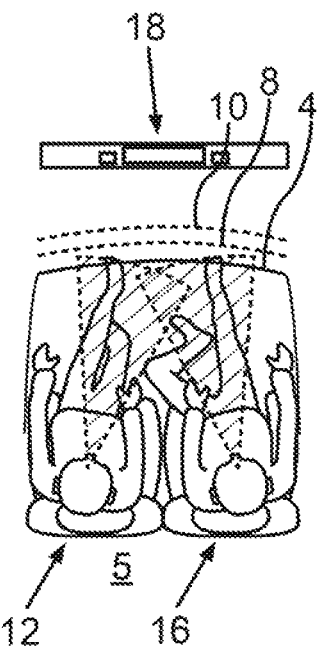
FIG. 5 is a further schematic plan view of the passenger compartment, wherein common contents are displayed to the driver and the front seat passenger by the display devices.

FIG. 5 shows the passenger compartment 5 in a further schematic plan view, wherein the driver 12 and the front seat passenger 16 now have common contents 18 displayed to them, distributed over the first display face 4 and the two virtual display planes 8, 10. As indicated schematically, the fields of vision of the two vehicle occupants 12, 16 intersect.

Figure 6:
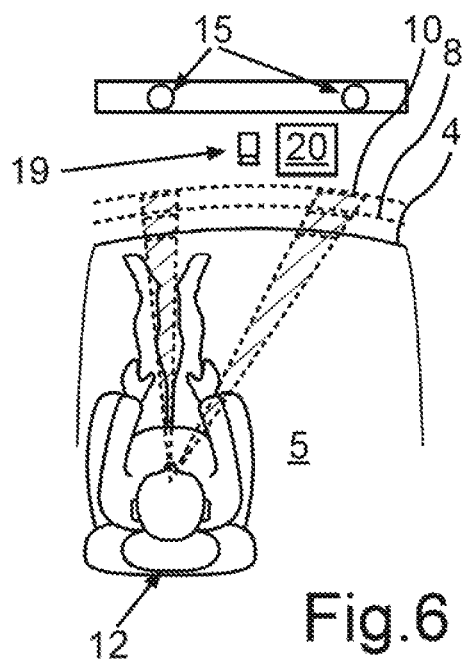
FIG. 6 is a further schematic plan view of the passenger compartment of the motor vehicle, wherein a camera and a control device are indicated schematically, by which camera and control device a parallax effect for the driver is adapted in accordance with the position of his eyes or the position of his head.

FIG. 6 shows the passenger compartment 5 in a further schematic plan view, wherein in the present case only the driver 12 is again seated alone in the motor vehicle 1. A sensing device in the form of a camera 19 and a control device 20 are additionally also illustrated schematically. The camera 19 is configured to sense a position of the eyes of the driver 12, wherein the control device 20 is configured to actuate at least one of the two display devices 3, 6 in accordance with the sensed position of the eyes of the driver 12, in order to compensate for a parallax effect. If the driver 12 adjusts, for example, his driver's seat further forward, rearward, upward or downward, the changing position of the eyes of the driver 12 is sensed by the camera 19. The control device 20 then actuates the two display devices 3, 6 in accordance with the changed position of the eyes, so that irrespective of the position of the eyes of the driver 12 the driver always identically perceives the contents 15 which are input into the display and which are displayed distributed over the three display planes 4, 8, 10. Irrespective of the sitting position of the driver 12 and also irrespective of the stature or size of the driver 12 it is therefore also possible for the contents always to be represented identically, the contents being displayed distributed over the three display planes 4, 8, 10 by the two display devices 3, 6.

The same can also occur for the front seat passenger 16 (not illustrated here). In order to be able to compensate for the parallax effect both for the driver 12 and for the front seat passenger 16, both display devices 3, 6 may be embodied as dual view displays. Therefore, using the two display devices 3, 6, it is possible to display different contents for the driver 12 and the front seat passenger 16 depending on the viewing angles. As a result it is also possible to carry out parallax compensation both for the driver 12 and for the front seat passenger 16.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A motor vehicle with a passenger compartment, comprising
    a first display with a first display face having a visible region visible from the passenger compartment of the motor vehicle with an invisible region out of sight from the passenger compartment; and
    a second display with a second display face invisible from the passenger compartment and reflecting on the visible region of the first display face, thereby producing a virtual display plane, visible from the passenger compartment, behind the first display face.

2. The motor vehicle according to claim 1, wherein the invisible region of the first display face outputs light first reflecting off the second display face and then reflecting off the visible portion of the first display face, thereby producing a further virtual display plane, visible from the passenger compartment, behind the virtual display plane.

3. The motor vehicle according to claim 2, wherein the first display face is curved.

4. The motor vehicle according to claim 3,
further comprising a dashboard and a windshield, and
wherein the first display face and the second display face are arranged in the dashboard of the motor vehicle, underneath the windshield of the motor vehicle.

5. The motor vehicle according to claim 4,
further comprising a driver seat and a front-seat passenger seat, and
wherein the first display face and the second display face extend in a transverse direction of the motor vehicle from in front of the driver seat to in front of the front-seat passenger seat.

6. The motor vehicle according to claim 5, further comprising:
a sensor configured to sense a position of eyes of at least one vehicle occupant, and
a controller configured to actuate at least one of the, first and second displays based on the position of the eyes, in compensation for a parallax effect.

7. The motor vehicle according to claim 6, wherein at least one of the first and second displays is configured to display two different screen contents depending on a viewing angle.

8. The motor vehicle according to claim 7,
wherein the sensor is configured to sense respective positions of the eyes of a driver and a front-seat passenger, and
wherein the controller is configured to actuate the at least one of the first and second displays compensates for the parallax effect for the driver and the front seat passenger.

9. The motor vehicle according to claim 8,
further comprising a ventilation outlet having a front edge, and
wherein the first display face is arranged underneath the ventilation outlet and set back from the front edge of the ventilation outlet.

10. The motor vehicle according to claim 1,
further comprising a driver seat and a front-seat passenger seat, and
wherein the first display face and the second display face extend in a transverse direction of the motor vehicle from in front of the driver seat to in front of the front-seat passenger seat.

11. The motor vehicle according to claim 1, further comprising:
a sensor configured to sense a position of eyes of at least one vehicle occupant; and
a controller configured to actuate at least one of the, first and second displays based on the position of the eyes, in compensation for a parallax effect.

12. The motor vehicle according to claim 11,
wherein the sensor is configured to sense respective positions of the eyes of a driver and a front-seat passenger, and
wherein the controller is configured to actuate the at least one of the first and second displays compensation for the parallax effect for the driver and the front seat passenger.

13. The motor vehicle according to claim 1, wherein at least one of the first and second displays is configured to display two different screen contents depending on a viewing angle.

14. The motor vehicle according to claim 1,
further comprising a ventilation outlet having a front edge, and
wherein the first display face is arranged underneath the ventilation outlet and set back from the front edge of the ventilation outlet.

15. The motor vehicle according to claim 1, wherein the first display face is flat.

16. A method for operating a display of a motor vehicle having a passenger compartment with a first display with a first display face having visible and invisible portions from the passenger compartment, and a second display with a second display face invisible from the passenger compartment, comprising:
displaying first contents on the visible portion of the first display face directly visible from the passenger compartment of the motor vehicle; and
generating second contents on the second display, invisible from the passenger compartment of the motor vehicle, but reflected on the visible portion of the first display face, thereby producing a virtual display plane, visible from the passenger compartment, behind the integral first display face.

17. A method according to claim 16,
Wherein the invisible portion of the integral first display face is out of sight from the passenger compartment and produces light first reflecting off the second display face and then reflecting off the visible portion of the integral first display face, and
further comprising generating third contents in the invisible portion of the first display face, thereby producing a further virtual display plane, visible from the passenger compartment, behind the virtual display plane.

18. A method according to claim 16, further comprising:
sensing a position of eyes of at least one vehicle occupant; and
actuating at least one of the first and second displays, based on the position of the eyes, in compensation for a parallax effect.

19. A method according to claim 16,
wherein the first and second contents are viewable from a first viewing angle, and
further comprising displaying at least third contents on at least one of the first and second displays, viewable from a second viewing angle different than the viewing angle of the first and second contents.

20. A method according to claim 16, wherein the integral first display face is flat.

* * * * *

UNITED STATES PATENT AND TRADEMARK OFFICE
CERTIFICATE OF CORRECTION

PATENT NO. : 11,034,242 B2  
APPLICATION NO. : 16/488900  
DATED : June 15, 2021  
INVENTOR(S) : Thomas Knittl et al.

Page 1 of 1

It is certified that error appears in the above-identified patent and that said Letters Patent is hereby corrected as shown below:

In the Claims

Column 9, Line 17 (approx.):  
In Claim 6, delete "the," and insert -- the --, therefor.

Column 9, Line 31:  
In Claim 8, delete "front seat" and insert -- front-seat --, therefor.

Column 9, Line 50:  
In Claim 11, delete "the," and insert -- the --, therefor.

Column 10, Line 3:  
In Claim 12, delete "front seat" and insert -- front-seat --, therefor.

Column 10, Line 32:  
In Claim 17, delete "Wherein" and insert -- wherein --, therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*